United States Patent [19]

Scandella

[11] 4,363,171

[45] Dec. 14, 1982

[54] COILABLE RULE AND REPLACEMENT CARTRIDGE THEREFOR

[75] Inventor: Louis Scandella, Marnay, France

[73] Assignee: Stanley Mabo, S.A., Besançon, France

[21] Appl. No.: 209,882

[22] Filed: Nov. 24, 1980

[30] Foreign Application Priority Data

Nov. 23, 1979 [FR] France ............................ 79 28905
Apr. 29, 1980 [FR] France ............................ 80 09585

[51] Int. Cl.³ ..................... B65H 75/48; G01B 3/10
[52] U.S. Cl. ..................................... 33/138; 242/107
[58] Field of Search ............... 242/107.3, 107, 84.8; 33/138, 139, 140

[56] References Cited

U.S. PATENT DOCUMENTS

| | | | |
|---|---|---|---|
| 3,450,367 | 6/1969 | Edgell | 33/138 X |
| 3,716,201 | 2/1973 | West | 33/138 X |
| 4,142,693 | 3/1979 | Czerwinski | 33/138 X |

*Primary Examiner*—Harry N. Haroian

[57] ABSTRACT

This coilable rule and its replacement cartridge comprise a tape mounted in a cartridge adapted to be detachably mounted in turn in a casing. The cartridge constitutes an integral unit and consists of a central post rigid with a lateral flange and of a spool comprising a lateral flange adapted to pivot about the central post. The lateral flange of the central post is formed integrally with an element for retaining the inner end of the tape on the spool, and this element extends over the outer peripheral wall of the spool, from which it is spaced, and is parallel to the central post. Lug means are also provided for holding the cartridge against rotation in the casing.

20 Claims, 25 Drawing Figures

COILABLE RULE AND REPLACEMENT CARTRIDGE THEREFOR

The present invention relates to a linear measuring instrument of the type comprising a coilable metal tape, a return spring and a cartridge adapted to be detachably fitted into a casing provided with a tape outlet slot, said cartridge having said coilable tape mounted therein and provided with a hook at its outer end, the cartridge consisting on the one hand of a central post having one end rigid with a perpendicular flange and on the other hand a spool provided with a lateral flange opposite said post flange and a peripheral wall formed with annular lateral radical flange between which the tape is adapted to be coiled on the peripheral wall of said spool, the return spring being housed in an annular chamber defined by said central post and said peripheral wall provided with an aperture through which the spring is connected to the tape, and further comprising an element for retaining the free end of the tape on said spool.

It is known, for example through the U.S. Pat. No. 4,067,513 to mount the measurement tape in a detachable cartridge to facilitate the assembly of the instrument and possibly permit the replacement of the cartridge in case of failure of the tape or its return spring.

The present invention is directed to facilitate and render more economical the manufacture and assembly of cartridge of the type broadly set forth hereinabove, notably by using automatic manufacturing and assembly means, and also to reserve the possibility of utilizing special cartridge shapes such that the casing can be dispensed with.

For this purpose, the measuring instrument as defined hereinabove is characterized in that the cartridge constitutes a compact unit and that said element for retaining the free end of the tape is formed integrally with the flange rigid with the central post. One portion of said retaining element extends above, and is spaced from, the peripheral wall of the spool, and parallel to said central post so as to cover the tape normally tending to uncoil itself.

Thus, the tape is coiled in a cartridge constituting a compact unit which, by virtue of its tape retaining element, prevents any untimely tape uncoiling due to the inherent elasticity of the bent tape during the storage and mounting thereof in a casing. With this arrangement it is thus possible to manufacture under mass-production conditions cartridges containing the measurement tapes which can be stored without difficulty before fitting them into their casings. On the other hand, a same spool can be used with different tape lengths, such as 2,3 or 5-meter tapes, provided that they have the same width.

To reduce the cartridge assembly operation to a single step, the central post is so designed that it projects through the lateral flange of the spool and that the flange rigid with the central post is also provided with at least one radial lug or like section element, said cartridge being adapted to be used in combination with a casing consisting of a one-piece case of which one of the main walls has a groove formed in its inner face at right angles to the open side of the casing, said groove being engageable by said central post and acting as a bearing therefor, the other main wall of said case being provided with a matching groove engageable by said radial lug for positioning and holding against motion said lateral flange rigid with the central post in said casing, the latter further comprising a cover or lid for closing said case. Thus, the assembly step merely consists in causing the cartridge to slip into the casing and closing the cover.

The present invention is also characterized by a particularly advantageous arrangement for braking or locking the tape, according to a principle known per se and described in the U.S. Pat. No. 3,214,836, wherein the braking means comprise several component elements. It is the purpose of the present invention to provide a braking or locking action of the same type but by using considerably simpler means, including a cartridge element.

The measuring instrument according to the present invention, adapted to for use with a casing provided with an aperture on one of its minor sides adjacent the tape outlet slot, is characterized in that said retaining element is rigid with a locking lever provided with a control knob adapted to be depressed from outside through said casing aperture, the complete member comprising said locking lever, the retaining element, and the central post and its flange being movable angularly within the casing from a position in which the locking lever is inoperative to a position in which the locking lever locks the tape against the other minor side adjacent the tape outlet slot.

According to a particularly advantageous form of embodiment of the cartridge, the latter can be used in a casing provided with a window for reading directly an internal measurement and wherein the tape path between the outlet slot and said window is kept constant by tape guide means. Such direct reading instruments have been known for many years and described notably in the U.S. Pat. No. 3,004,346 granted to the applicant. In measuring instruments of this type the tape is also provided with a graduated scale on its back, which is offset in relation to the normal scale to permit the direct reading of an internal measurement while taking due account of the casing length. With the present invention, these means for guiding the tape under the window can be obtained in a particularly convenient and advantageous way. To this end, the flange rigid with the central post is provided with an outer peripheral wall surrounding the peripheral wall of said spool, the central post peripheral wall being provided with a peripheral outlet aperture for the tape. The guide means consist of said central post peripheral wall to which the first turn of the coiled tape is applied.

According to another important feature characterizing this invention, the central post has formed therein a longitudinal slit opening at the free end thereof and defining tongues of which at least one is resilient, the purpose of this slit consisting in permitting the insertion and anchorage of the inner end of the return spring, the free ends of said tongues being provided with radial retaining studs permitting the insertion by elastic distortion of at least one of said tongues into the central aperture of the spool flange.

Thus, due to the provision of the aforesaid slit in the central post, which opens at the end thereof, the return spring can easily be assembled with the central post by using automatic means, so that the cost of the complete instrument can be reduced appreciably. Moreover, the cartridge is closed by simply clipping the central post into the corresponding aperture of the spool flange, this clipping being likewise easily accomplished through mechanical means, to yield a compact, easily detachable unit, without any risk of untimely disassembling of its component elements, as observed in prior art cartridges of this character.

Finally, and according to another feature characterizing the present invention, the retaining element is provided with a notch adapted to hold the outer end of the spring during the first assembly step, and the outer peripheral wall of the spool comprises keeper means for connecting the inner end of the measuring tape or blade to the outer end of the return spring when assembling the cartridge.

This arrangement permitting of separating the means coupling the tape and the spring is particularly advantageous in that the various assembly steps can be divided into substeps whereby the complete assembly operation can be carried out in a fully automatic manner.

A better understanding of the invention will be obtained from the following detailed description and the accompanying drawings of a few illustrative form of embodiment of the invention.

FIG. 5 is a side elevational view of the central post alone, of which

As illustrated in FIGS. 1-5 of the drawings, the measuring instrument comprises a casing 100 into which a detachable or replacement cartridge 1 enclosing the metal coilable, bent measuring tape or blade 2 can be inserted. This cartridge 1 comprises a first portion adapted to be fastened and held against motion in the casing 100, which consists of a central post 3 molded integrally with a lateral flange 4, and a spool 5 pivotally mounted on said central post 3. The spool 5 comprises on the one hand a disk 6 having a central hole 7 adapted to receive the free end of the central post 3 which, in its assembled condition, projects laterally from said disk 6, and on the other hand a cylindrical outer peripheral wall 8 on which the measuring tape 2 is adapted to be coiled. A pair of annular side flanges 9,10 formed integrally with said peripheral wall 8 are provided for retaining laterally the coiled tape 2 on the spool. A return spiral spring 11 constantly urging the tape 2 to its fully coiled condition is mounted in the annular chamber defined by the inner face of peripheral wall 8 of spool 5, the central post 3, the spool disk 6 and the circular flange 4 of post 3.

Figure 5:
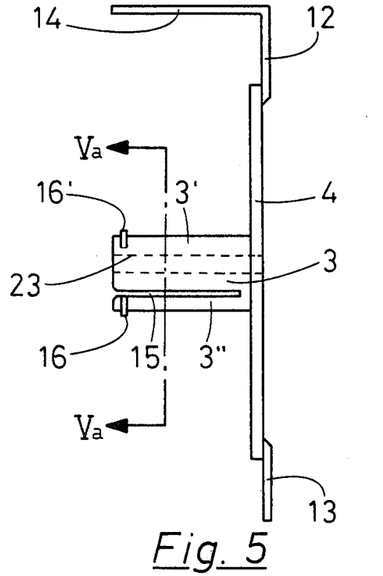

This central post 3 has an axial bore 23 formed therethrough and comprises a longitudinal slot 15 opening into its free end to define a pair of resilient tongues 3', 3" provided at their free ends with a pair of radial retaining ribs 16 and 16'. Thus, when assembling the cartridge the central post 3 can be introduced into the central hole 7 of the spool disk 6 by causing the elastic distortion of at least one of said resilient tongues 3', 3" defined by said slot 15, the post 3 being retained in said central hole 7 by the radial ribs 16, 16'. Moreover, before assembling the cartridge, the return spring 11 is anchored at its inner end in the aforesaid longitudinal slot 15 of post 3, an operation that can be accomplished very easily by using mechanical or automatic means for introducing the spring end in the axial direction from the outer end of this slot 15.

The projecting end of central post 3 is adapted to be supported in a recess 107 of said casing 100 and consisting of the bottom of an internal intermediate groove 106 formed in one 104 of the main sidewalls of casing 100. In the first form of embodiment illustrated in FIGS. 1 to 5 of the drawings this central post 3 has a substantially cylindrical configuration with a circular cross-section, and is adapted to cooperate with the rounded recess 107 constituting the inner end of said groove 106. However, if desired, this post 3 may have any other cross-sectional configuration, for example a square or rectangular cross-sectional configuration, its free end fitting into the end of a matching groove formed in the casing so as to be held against motion therein. In addition, the flange 4 of post 3, which in the example illustrated is circular and assist in supporting the cylindrical outer peripheral wall 8 of spool 5, could as well have any other shape, as will be explained presently.

Formed on the outer face of the circular flange 4 of central post 3 (FIGS. 1 and 3) are a pair of radial, diametrically opposed projections or lugs 12,13 adapted to guide and position the cartridge in the casing 100 which, to this end, has formed in its main sidewall 101 (opposite wall 104) another groove 105 parallel to and registering with groove 106. These lugs 12,13 consisting for example of simple tongues projecting radially and axially from the outer face of flange 4 also act as a means for axially or laterally retaining this flange 4 in relation to the spool, thus preventing the crushing of said flange 4 within the spool. One lug 12 carries an inner extension 14 parallel to the spool axis and such that, when the cartridge elements are assembled, it overlies the cylindrical outer peripheral wall 8 of spool 5 and is therefore parallel to post 3 and at a proper relative spacing with respect to the annular lateral flanges 9,10 of said spool. The purpose of this lug extension 14 is to hold the inner end of the measuring tape provided as conventional with an L shaped end hook 17. In fact, when the tape 2 is coiled on spool 5 its normal tendency is to uncoil itself due to the inherent elasticity of the bent tape material and also to the force of its return spring. Thus, with this simple tape retaining means consisting of the inner extension 14 of lug 12, the cartridge and coiled tape assembly can easily be assembled by using mechanial means, and then stored, without any risk of untimely uncoiling of the measuring tape. This cartridge thus constitutes a compact unit that can easily and safely be fitted into or removed from the casing, by simply causing the cartridge to slide into the casing, like a drawer.

Figure 1:
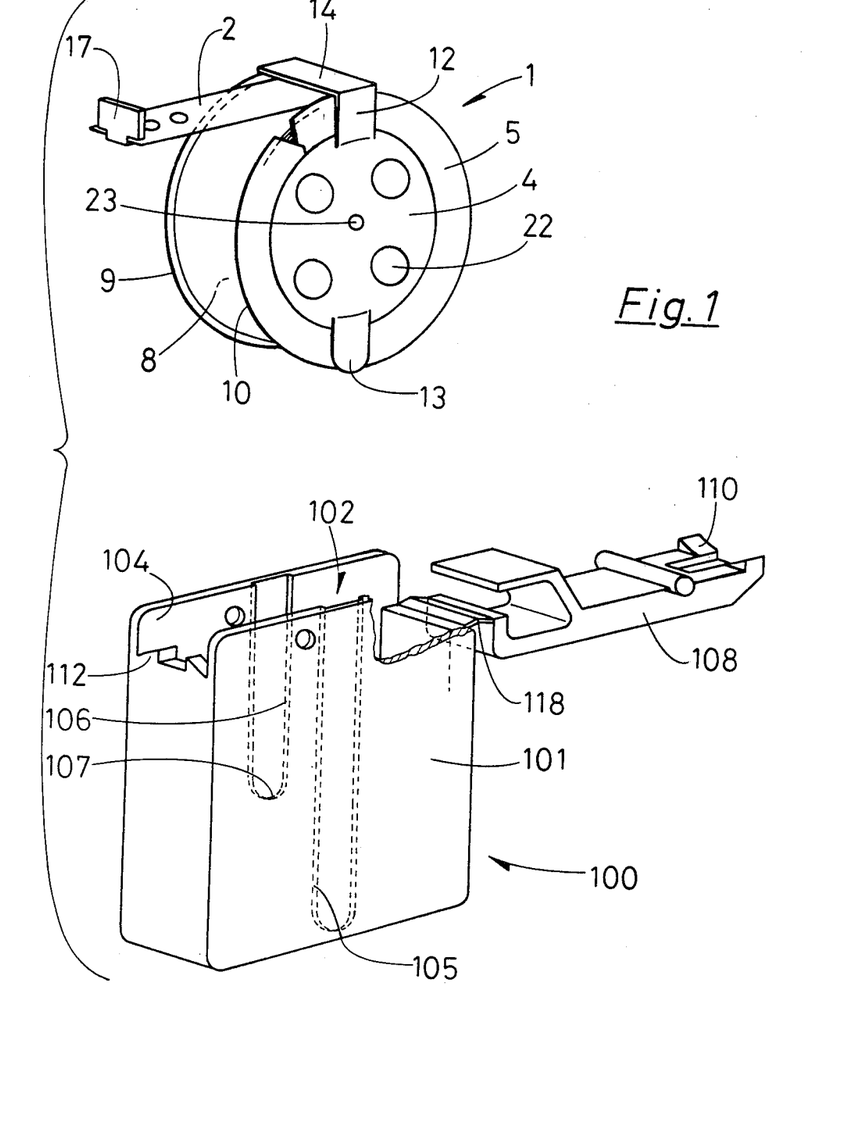
FIG. 1 is a general comprehensive, partially exploded perspective view of a first form of embodiment of the cartridge (top) ready for insertion into the casing (bottom)
Figure 2:
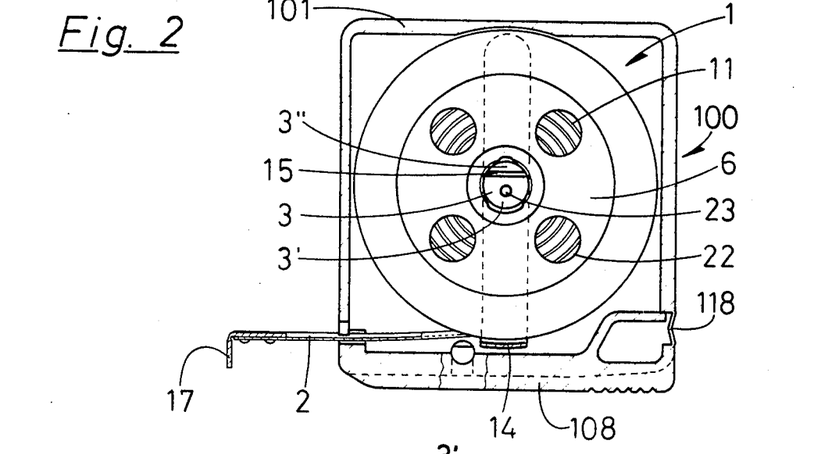
FIG. 2 is a front elevational view of one face of the cartridge fitted into the closed casing (shown in vertical section) and ready for use.
Figures 3, 5A, 6:
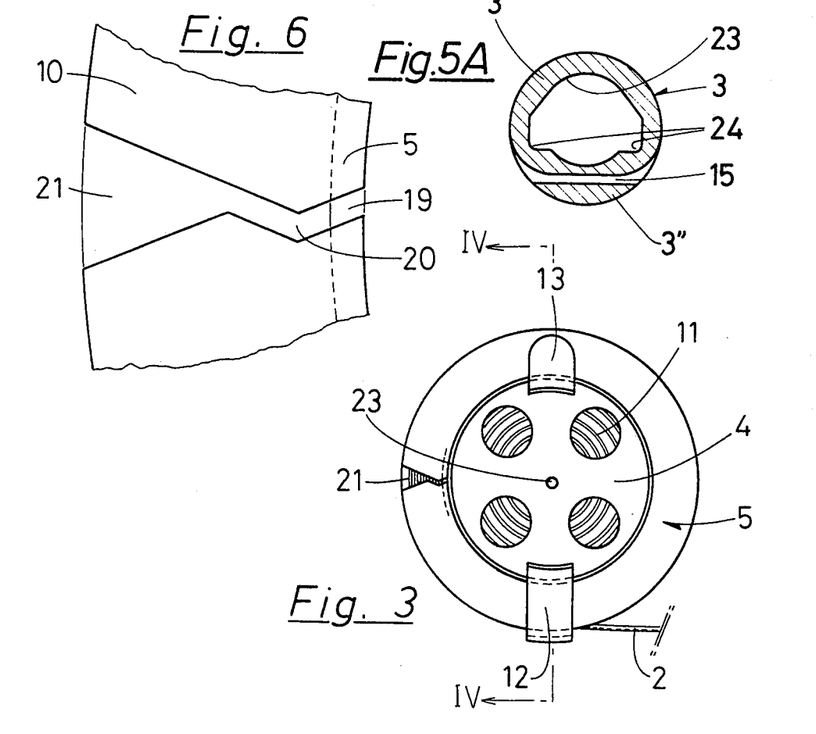
FIG. 3 is a front elevational view of the opposite face of the cartridge.
FIG. 5A is a cross section taken along the line Va—Va.
FIG. 6 is a considerably enlarged view of a detail showing the slot provided for inserting the spring into the spool.
Figure 4:
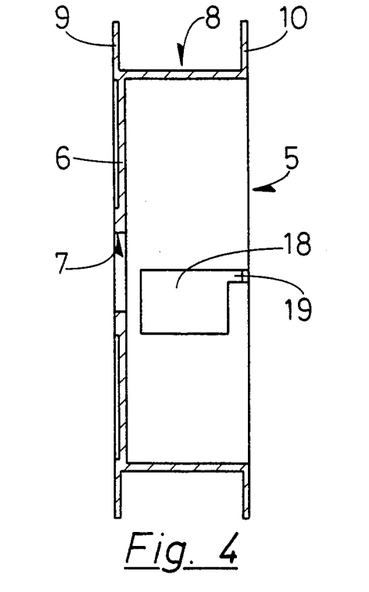
FIG. 4 is a section taken along the line IV—IV of FIG. 3, but showing on a larger scale the spool alone.

Besides, as shown in FIGS. 1 and 2, the casing 100 adapted to receive the cartridge 1 consists of a one-piece case 101 having an open side 102 adapted to be closed by a cover 108 connected by hinge means 118 to the case. This cartridge is adapted to be so introduced into the casing in a position such that the lug 12 formed with a perpendicular extension 14 is directed towards the open face 102 of the casing, whereby said extension 14 may act as a stop member to the cartridge against the cover 108 when the latter is closed. Thus, no frictional contact can take place between the spool 5 and cover 102 when the measuring tape is coiled or uncoiled through the outlet slot defined by the lip 110 of cover 108 and the matching lip 112 formed in the casing.

Another improvement characterizing the cartridge of this invention is the original mounting of the return spring 11, also with a view to permit the use of automation means for carrying out the various mounting steps. As already mentioned in the foregoing, the central post 3 to which the inner end of return spring 11 is anchored has a longitudinal slot 15 formed therein to permit the axial or lateral insertion of spring 11. This other improvement relates to the mounting of the outer end of spring 11 through the aperture 18 of the outer peripheral cylindrical wall 8 of spool 5. This aperture 18, of rectangular configuration (FIG. 4), permits the passage of the outer end of spring 11 which is attached in the known fashion to the inner end of measuring tape 2. The width of this aperture 18 is slightly greater than the width of spring 11 but smaller than the width of tape 2, to prevent the latter from penetrating into the spring chamber. To facilitate the insertion of the outer end of spring 11, the aperture 18 opens into one of the lateral flanges 10 of spool 5 through a slot 19 constituting a baffle means 20 (FIG. 6) on said flange 10 and ending with a V-shaped portion 21. This baffle-like configuration of slot 19 prevents any undesired distortion of the lateral flange of spool 5 on either side of said slot, as would be observed in case a rectilinear slot were used, which would entail an undesired braking of the measuring tape. Preferably, the circular flange 4 of central post 3 and the spool flange 6 comprise a plurality of spaced symmetrical holes 22 for reducing the cartridge weight.

Figure 7:
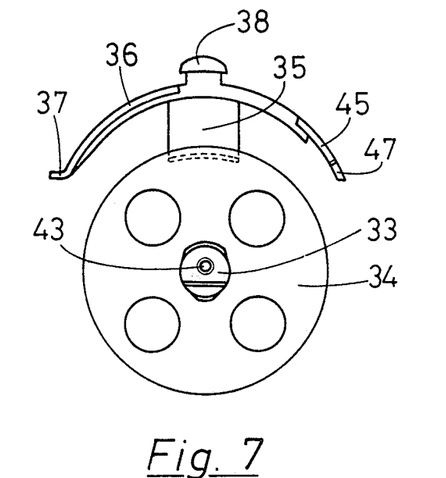
FIG. 7 is a front elevational view of a second embodiment of the central post.
Figure 8:
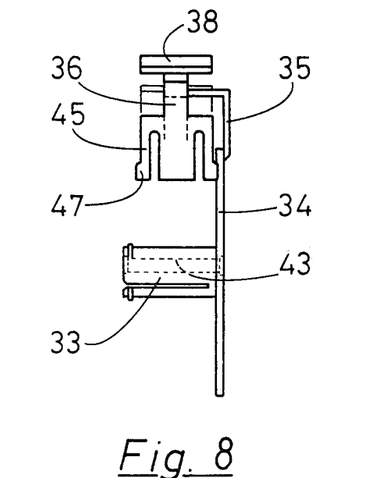
FIG. 8 is a side elevational view of the central post of FIG. 7.
Figure 9:
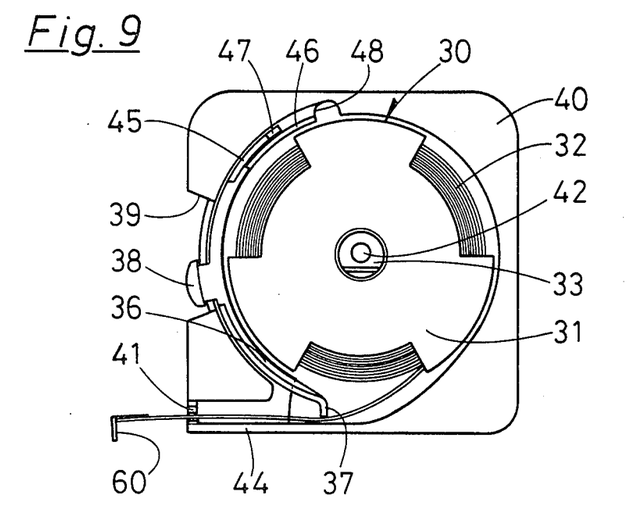
FIG. 9 illustrates in front elevational view this second embodiment, with the cartridge fitted home in a corresponding casing shown in its open condition.

According to a manified form of embodiment of the cartridge, shown in FIGS. 7-9, tape braking or locking means are incorporated in the cartridge.

In this case, the movable element of cartridge 30, i.e. the spool 31, is unchanged, except that the weight of its outer peripheral flange may be reduced, for instance by forming notches therein, as illustrated in FIG. 9. On the other hand, the circular flange 34 rigid with the central post 33 (FIGS. 7 and 8) comprises only one radial lateral lug 35 formed with a perpendicular inward extension rigid with an arcuate braking or locking lever 36 overlying the lateral wall of the spool, the end 37 of this lever 36 being bent outwardly and extending substantially at right angles to the direction in which the measuring tape 32 emerges from the casing. This braking member 36 also comprises an integral control knob 38 to which access can be had through a window 39 formed in a wall of casing 40, adjacent the tape outlet slot 41. In the form of embodiment illustrated, the casing 40 consists of two interfitting halves, one half being formed integrally with a central shaft 42 on which the cartridge 30 is mounted, the central post of the cartridge being provided with a central axial bore 43 for this purpose. The braking lever 36 is movable angularly about the shaft 42 within the casing and is an integral portion of the lateral lug 35, the cylindrical peripheral wall 34 and the central post 33; in fact, it is movable from an inoperative position in which its lower bent end portion 37 is spaced from the path of tape 32 to a position in which the same bent end portion 37 engages the tape 32 and locks same against the other peripheral wall 44 of casing 40, adjacent the tape outlet slot 41.

The lever 36 is guided within the casing 40 by an internal wall 46 adapted to guide a resilient blade 45 constituting the extension of said lever 36 at the end thereof opposite said bent end portion 37. In addition, this resilient blade 45 is formed with lateral projections 47 which, when the lever 36 is in its inoperative position, are resiliently urged against a stop forming portion 48 of casing 40. In this case, the circular flange 34 rigid with the central post 33 does not comprise any lateral projection cooperating with a matching portion of the casing, since it must be able to move angularly within the casing to permit the movement of the brake lever 36 rigid therewith.

FIGS. 10 to 14 of the drawings illustrate a third form of embodiment of the cartridge 50. In this case, the flange or sidewall 54 thereof, rigid with the central post 53, is formed integrally with an outer peripheral wall 57 surrounding the outer peripheral wall 56 of spool 51 and having formed therein a peripheral outlet aperture 58 to permit the passage of the measuring tape 52. The inner face of sidewall 54 comprises an annular shoulder 54' for guiding the rotation of spool 51, thus minimizing the frictional contact between these two members. The outer face of sidewall 54 also comprises projections 54a, 54b so shaped as to hold the cartridge against movement in a casing provided with matching retaining elements.

Figure 10:
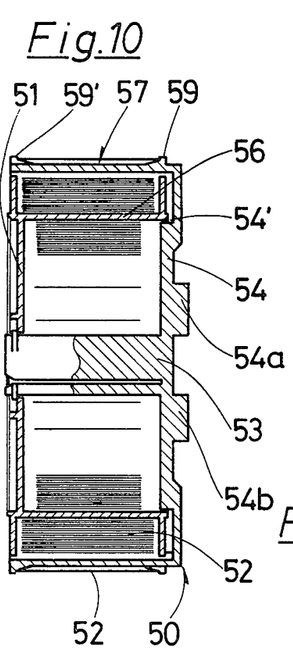
FIG. 10 is a vertical section taken across a third embodiment of the cartridge.
Figure 11:
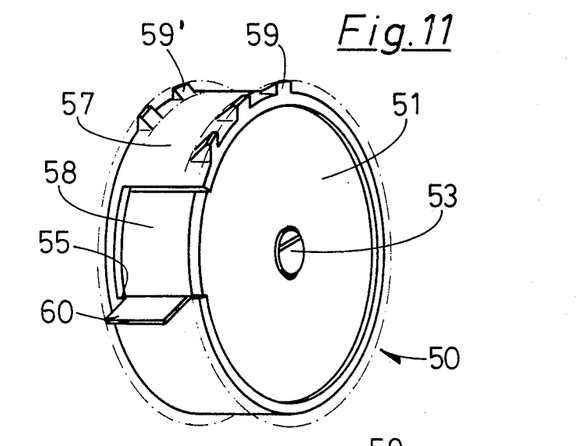
FIG. 11 is a diagrammatic perspective view of the third embodiment of the cartridge.
Figure 12:
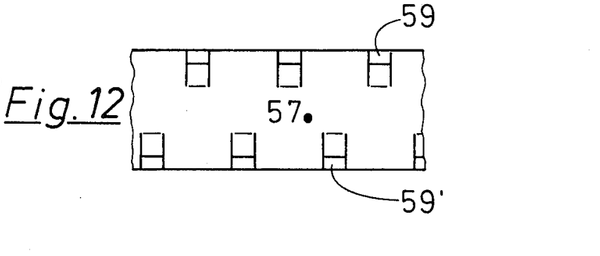
FIG. 12 is a fragmentary front view of the outer peripheral wall rigid with the central post of the third embodiment.

When the measuring tape 52 is mounted in cartridge 50 in the same manner as described hereinabove, its outer end provided with hook means 60 abuts the edge 55 of aperture 58, thus preventing any untimely uncoiling of the tape. The means for producing the mutual locking engagement between the spool 51 and the central post 53 is the same as the one described in the preceding forms of embodiments, and in the present instance the cartridge constitutes a compact unit which, strictly speaking, could be used without the corresponding casing.

Figures 13, 14:
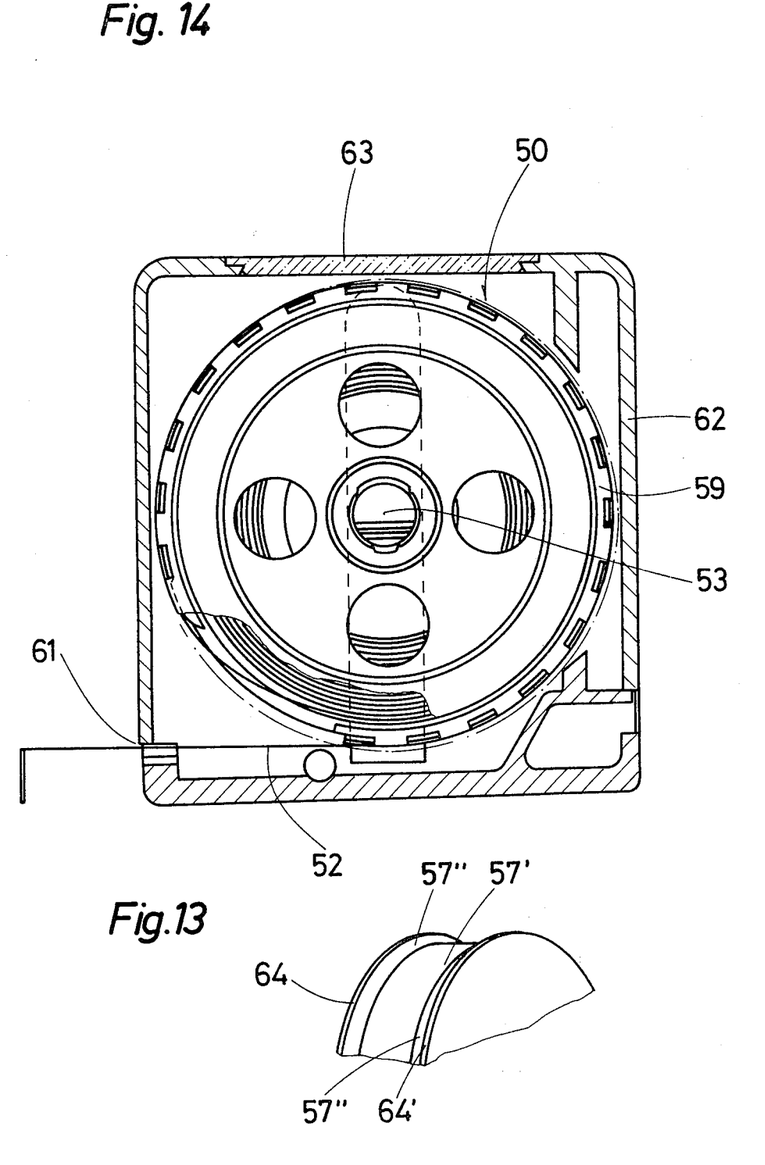
FIG. 13 is a fragmentary view of a modified version of the third embodiment.
FIG. 14 is a diagrammatic elevational and section view of the cartridge of FIGS. 10-12 mounted in a casing provided with a window for the direct reading of an internal measure.

However, a particularly advantageous application of this cartridge is obtained in direct reading instruments of the type comprising a casing having a reading window for the direct reading of internal measures, i.e. the distance between the tape end and the opposite face of the casing. In hitherto known instruments of this type, the path followed by the tape between the outlet slot and the window is kept to a constant value by internal guide means consisting, for example, of inner walls or rollers over which the tape is caused to pass during the uncoiling thereof. With the present invention it is possible to dispense with these guide means in the casing by causing the first turn of the coiled tape, as it emerges from the cartridge, to pass over the peripheral wall 57 rigid with the central post, whereafter the tape can proceed through the outlet slot 61 of a casing 62 in which said cartridge 50 is mounted. Since the tape 52, due to the tension of its return spring, is urged against the peripheral wall 57 rigid with the central post 53, the tape length measured between the window 63 and the outlet slot 61 remains constant.

In order to guide the tape 52 laterally on the peripheral wall 57, the latter is provided along its side edges with projections 59, 59' having in radial section substantially the shape of Buttress threads, or a rectangular trapezoidal configuration, the inner faces of said projections being inclined inwardly in order to minimize frictional contacts between the tape and said wall. Moreover, in order further to reduce these frictional contacts, the projections 59 formed on one edge alternate with those 59' formed on the opposite edge, as clearly shown in FIG. 12.

In another modified form of embodiment of the invention, illustrated in FIG. 13, the projections 59, 59' of the preceding form of embodiment are replaced by a pair of peripheral rings 64,64' formed along both edges of the outer peripheral wall 57', each ring 64,64' having its inner face 57" inclined inwardly.

In a further modified form of embodiment, roller means (not shown) could be provided between the lateral flanges of said peripheral wall 57 so that the tape would be uncoiled by passing on said rollers.

In all the forms of embodiment illustrated in the drawings, the flange rigid with the central post has a circular configuration; however, any other shape may be contemplated for this flange, especially if the latter is provided with a peripheral wall, as in the last form of embodiment described hereinabove. In fact, this end flange, with its outer peripheral wall, could be given a shape matching that of the internal chamber of the casing, advantageously with rounded corners having the natural radius of curvature of the tape, in order to minimize frictional contacts.

As already mentioned hereinabove, the central post comprises means for holding same against rotation in the casing in which it is fitted. According to a preferred form of embodiment of this invention, illustrated in FIG. 5A, the axial bore 23 formed in the post comprises non-circular portions 24 adapted to cooperate with a correspondingly shaped projection formed in the casing. These means could also consist simply of a flat face, or a square-sectioned element. This form of embodiment is particularly suitable when the cartridge is mounted in a casing consisting of two halves.

Reference will now be made to FIGS. 15 to 24 illustrating a modified form of embodiment of the cartridge shown in FIGS. 1-5, the same reference numerals being used for designating similar component elements.

In the present case (FIGS. 15 to 24) the L-shaped projection 12-14 rigid with the central post 3 (FIGS. 21-22) has a notch 124 formed therein (FIGS. 15 and 21) adapted to retain the outer end of the return spring during the first step of the instrument assembly procedure, and the outer end of the measuring tape 200, provided for this purpose with an L-shaped end hook, when the cartridge assembly is completed. To this end, the outer end 127 of spring 111, illustrated in FIG. 23, has a pair of notches 126,126' formed therein to provide a pair of lateral lugs 128,128' adapted to engage the notch 124 and bear against the edges 125,125' of said notch.

Figure 15:
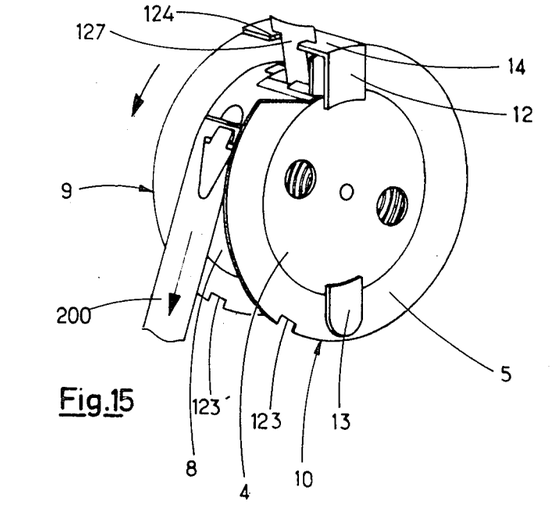
FIG. 15 is a general perspective view of a fourth embodiment of the cartridge, in which the return spring is anchored to the central post and the inner end of the measuring tape is attached to the spool.
Figure 16:
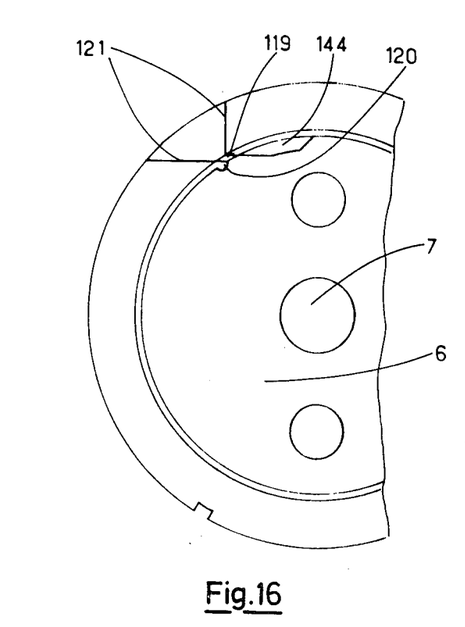
FIG. 16 shows on a larger scale the slot provided for inserting the spring into the spool of FIG. 15.

The spring 111 is wound on the central post 3 and as in the preceding forms of embodiment, its inner end is retained in the slot 15 of central post 3' and its outer end 127 is held in said notch 124. Thus, the spring 11 will constitute with the central post 3 a compact and independent sub-assembly adapted to be handled without any specific care during a mass production process.

This first sub-assembly (FIG. 20) is thus assembled by using automation means, whereafter the spool 5 can be fitted thereto. Formed on the outer peripheral wall 8 of this spool are two apertures 117,218 for anchoring the inner end of measuring tape 200 and the outer end 127 of return spring 111, respectively. Besides, the aperture 218 comprises (FIGS. 16 and 17) on the one hand a slot 119 and a V-shaped notch 121 on the other hand, to permit the passage of the outer end of return spring 111 which is retained by the transverse element 14 (FIG. 15).

Figure 17:
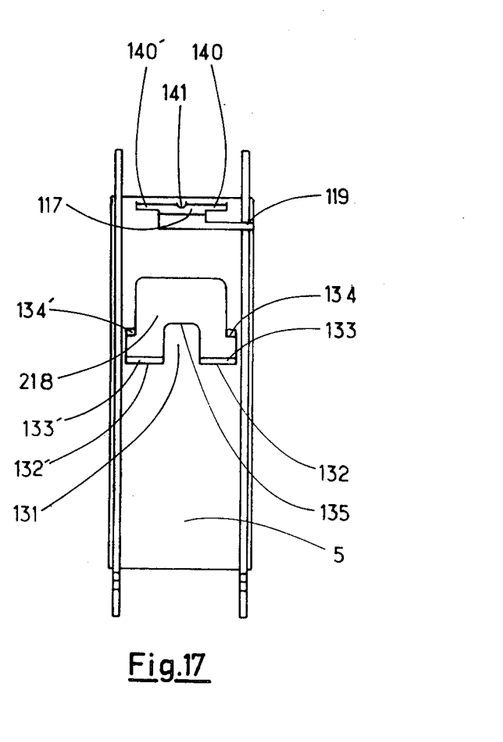
FIG. 17 is a side elevational view of the spool of FIG. 15 showing the two apertures to which the spring and tape are anchored, respectively.
Figure 19:
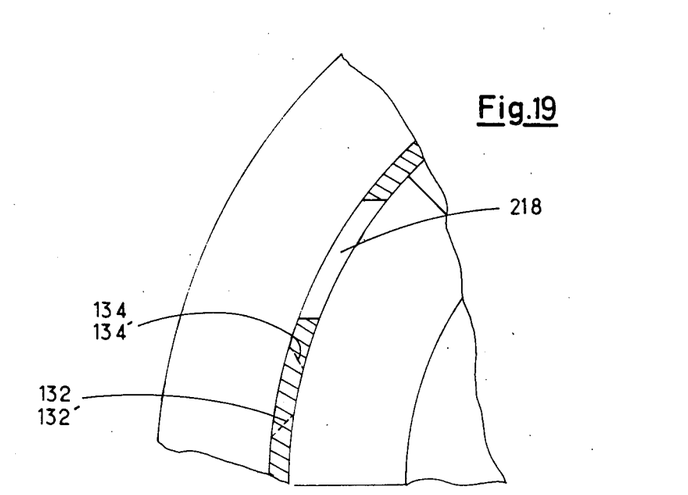
FIG. 19 is a sectional view showing on a larger scale the aperture for anchoring the inner end of the measuring tape.
Figure 20:
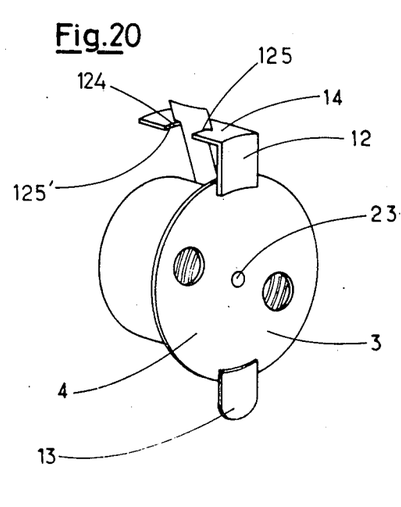
FIG. 20 is a perspective view of the central post of FIG. 15, with the spring end retained in the notch.
Figure 21:
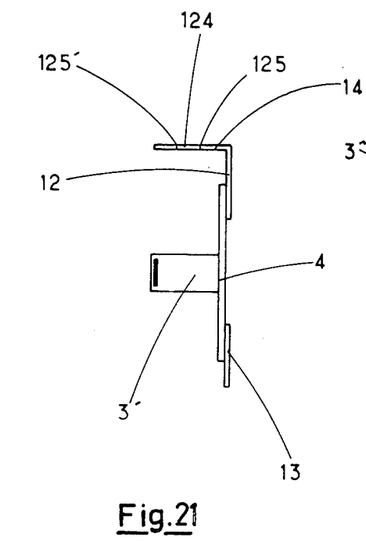
FIG. 21 is a side elevational view of the same assembly.
Figure 22:
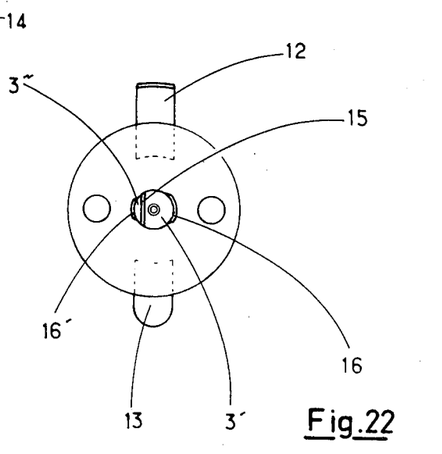
FIG. 22 is a front elevational view of the same assembly.
Figure 23:
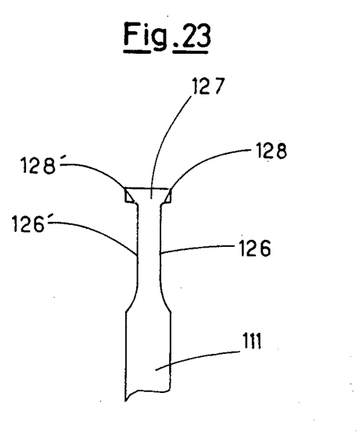
FIG. 23 is a detail view of the outer end of the return spring.
Figure 24:
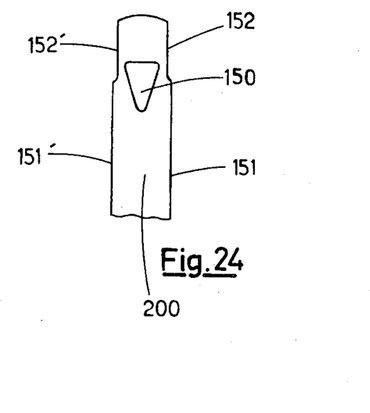
FIG. 24 is another detail view of the inner end of the measuring tape.

Once the spool 5 has been fastened to the central post 3 as a consequence of the elastic distortion of the tongue 3', 3" introduced into the central hole 7 of the spool, flange and retained by the pair of studs 16,16', a compact, independent unit is obtained which can be transferred in view of the next assembly step consisting in engaging the inner end of measuring tape 200 into the aperture 218 formed in the peripheral wall 8 of spool 5, as explained hereinabove. Of course, this operation can be carried out by using automatic means. The inner end of tape 200 is presented in a position parallel to the outer peripheral wall 8 of spool 5 so that said end registers with said aperture 218. With the tape thus held, it is only necessary to rotate the assembly for causing the aperture 150 of tape 200 to engage the anchoring lug 131 provided on the peripheral wall 8 of spool 5. The side edges 151 and 151' of tape 200 bear against the lower edges 132 and 132' of aperture 218, while the two notches 152,152' of the inner end of tape 200 bear against the upper shoulders 134, 134' facing the lower edges 132 and 132'.

Another essential feature characterizing this invention lies in the fact that the outer edge 135 of lug 131 projects beyond the upper shoulders 134,134' to an extent sufficient to prevent the tape from being disconnected when it is in axial alignment with spool 5.

Another important feature of this invention consists of the method contemplated for releasing the outer end of return spring 111 from the L-shaped element 12–14 to which it is anchored, for transferring said outer end to the aperture 117 formed in the outer peripheral wall 8 of spool 5.

Figure 18:
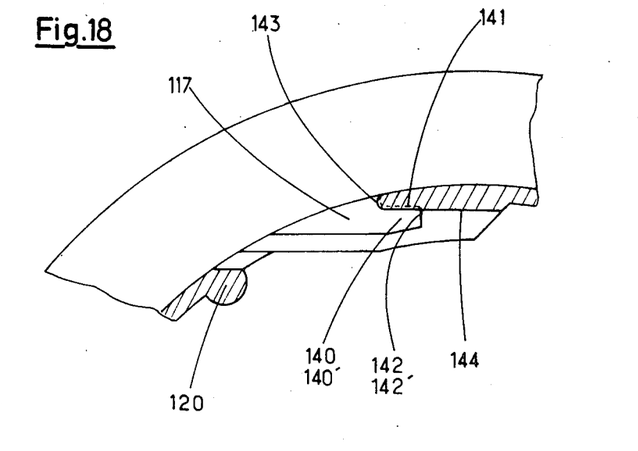
FIG. 18 is a sectional view showing on a larger scale the aperture for anchoring the outer end of the return spring.

In fact, pulling the tape to cause the rotation of spool 5 will cause the external anchored end 127 of spring 111 to bear or react against the edge of tongue 143 overlying the aperture 117 formed in the outer peripheral wall 8 of spool 5. Due to the tractive force thus exerted, the pair of studs 128 and 128' (FIG. 23) of the spring end are ejected from the edges 125 and 125' of notch 124 of said transverse element 14 on which they bore beforehand. Since the spring is wound, its end 127 tends to recede into the annular chamber but is prevented from retracting by the pair of studs 128 and 128' engaging the stops 142 and 142' of recesses 140 and 140' provided for holding the spring end against movement. The depth of said recesses 140 and 140' must be sufficient to accommodate the two studs 128 and 128' formed at the outer end of spring 111, so that this end cannot project radially outwards beyond the peripheral wall 8 of spool 5. Moreover, the tongue 143 formed on the peripheral wall 8 of spool 5 at the top of aperture 117 also holds the spring end so that the spring will not protrude beyond the outer diameter of this wall irrespective of the angular position of the outer end of said spring, since this angular position may vary as a function of the spring winding diameter. Formed on this tongue 143, throughout the length thereof, is a central projection or boss 141 adapted to maintain the spring camber and prevent the pair of studs 128 and 128' from catching the front end of said tongue 143. The fitting of the pair of studs formed at the outer end of return spring 111 defines a protrusion 144 within the peripheral wall 8 which reinforces the rigidity of the coil on one side of slot 119, the other side being reinforced by another protrusion 120 registering with the first one.

What is claimed is:

1. A coilable-rule linear measuring instrument with a coiled return spring, comprising a cartridge detachably mounted in a casing provided with a tape outlet slot, said cartridge having mounted therein a tape provided with a hook at its outer end, said cartridge having a central post having one end rigid with a lateral flange and a spool having a lateral flange formed with a central aperture and adapted to pivot about said central post, said spool further having a peripheral wall provided with generally annular side flanges between which the measuring tape is wound on said outer peripheral wall; a tape return spring mounted in an annular chamber defined by said central post and said peripheral wall, said peripheral wall having an aperture through which said spring is connected to said tape, said cartridge including an element for retaining the free end of said tape on said spool, whereby said cartridge constitutes a compact unit, said retaining element being formed integrally with said lateral flange rigid with said central post, the end of said central post which is opposite said lateral flange projecting externally from the lateral flange of said spool, said central post lateral flange being provided with at least one radial holding lug, said cartridge being slidably fitted in said casing, said casing including a one-piece case having a groove formed in one of its main sidewalls, said groove extending at a right angle to the open side of said casing and being adapted to be engaged by said central post and to constitute a recess engageable thereby, the opposite main sidewall being provided with a hollow portion engaged by said at least one radial lug for positioning and holding against movement said lateral flange rigid with said central post in said casing, said casing further including a cover for closing said case.

2. The coilable-rule linear measuring instrument of claim 1, wherein said retaining element, in the assembled condition of said cartridge in said casing, registers with the open side of said casing and is adapted to act as a stop for said cartridge engaging said cover when the latter has been inserted home into said casing through said open side.

3. The coilable-rule linear measuring instrument of claim 2, wherein said retaining element consists of an L-shaped element of which one arm overlies said peripheral wall of said spool and is parallel to said central post, the other arm of said element being rigid with said lateral flange of said central post and constituting one of said radial holding lugs.

4. The measuring instrument of claim 3, wherein said central post has a longitudinal slot formed therein which opens at its free end and defines tongues means of which at least one is elastic, said slot serving the purpose of permitting the insertion and locking of the inner end of said coiled return spring, the free ends of said tongue means being provided with radial retaining studs whereby said central post can be inserted home into said central aperture of said spool flange by causing the elastic distortion of at least one of said tongue means.

5. The measuring instrument of claim 4, wherein said peripheral wall aperture engaged by the outer end of said spring which is connected to said measuring tape, opens into one of the annular side flanges of said spool via a baffle-forming slot preventing the distortion of said annular side flanges on either side of said slot, the latter opening preferably into the end of annular said side flange through a V-shaped opening.

6. The measuring instrument of claim 1, wherein said central post is provided with a central hole having a non-circular cross-sectional configuration, adapted to be engaged by a matching projection formed on at least one of the casing sidewalls so as to hold said cartridge against rotation in said casing.

7. A coilable-rule linear measuring instrument with a coiled return spring, which comprises a cartridge detachably mounted in a casing formed with a tape outlet slot and with an aperture on one of its minor sides adjacent said slot, said cartridge having mounted therein a coilable measuring tape provided with a hook at its outer end, said cartridge having a central post rigid with a lateral flange at one end, and a spool comprising a lateral flange pivoting about said central post and an outer peripheral wall provided with annular side flanges between which said tape is wound on said outer peripheral wall of said spool, a tape return spring mounted in an annular chamber defined by said central post and said outer peripheral wall, said peripheral wall having an aperture through which said return spring is connected to said tape, said cartridge including an element for retaining the free end of said tape on said spool, said cartridge constituting an integral unit and said retaining element being formed integrally with said central post lateral flange and being rigidly connected to a locking lever provided with a control knob accessible through said casing aperture, the sub-assembly consisting of said locking lever, retaining element, lateral flange and central post being movable angularly within said casing from a position in which said locking lever is inoperative to a position in which said locking lever is adapted to lock said tape against the other minor side of said casing which is adjacent said tape outlet slot.

8. The measuring instrument of claim 7, wherein said locking lever is provided with a resilient lug formed with at least one lateral projection and said casing has an inner stop formed therein which is engageable by said projection when said locking lever is in its inoperative position.

9. A coilable-rule linear measuring instrument with a coiled return spring comprising a cartridge adapted to be detachably mounted in a casing formed with a tape outlet slot said cartridge including a tape provided with a hook at its outer end, said cartridge having a central post rigid with a lateral flange at one end and a spool comprising a lateral flange adapted to pivot about said central post and an outer peripheral wall provided with annular side flanges between which said tape is wound on said outer peripheral wall of said spool, a tape return spring mounted in an annular chamber defined by said central post and said outer peripheral wall, said peripheral wall being provided with an aperture through which said spring is connected to said tape, said cartridge including an element for retaining the free end of said tape on said spool, said cartridge constituting a compact unit, said retaining element being formed integrally with said lateral flange rigid with said central post and formed with an outer peripheral wall surrounding said peripheral wall of said spool, said outer peripheral wall of said retaining element having an aperture to permit the passage of said tape therethrough, one edge of said aperture constituting said retaining element.

10. The measuring instrument of claim 9, additionally including a casing provided with a window for the direct reading of an internal measure, and tape guide means for keeping to a constant value the tape path between the outlet slot and said window and wherein said tape guide means consists of said outer peripheral wall rigid with said central post and engaged by the first inner turn of said tape.

11. The measuring instrument of claim 10, wherein said outer peripheral wall rigid with said central post has a circular configuration, is concentric to the outer peripheral wall of said spool, and adapted to accomodate at least partly the casing shape in the reading window area thereof.

12. The measuring instrument of claim 9, wherein said outer peripheral wall rigid with said central post comprises rounded corners having the natural radius of curvature of said tape.

13. The measuring instrument of claim 12, wherein said outer peripheral wall rigid with said central post is provided along the outer edges of its annular lateral flanges with projections inclined towards the spool center so as to support only the marginal portions of the tape and thus reduce the frictional contact between the tape and the spool, the projections formed along one edge alternating with those formed on the other edge.

14. The measuring instrument of claim 9, wherein said outer peripheral wall rigid with said central post is provided along the lateral outer edges with peripheral rings acting as lateral guide means for the tape, the inner wall of said rings being inclined inwardly.

15. A coilable-rule linear measuring instrument with a coiled return spring comprising a cartridge adapted to be detachably mounted in a casing formed with a tape outlet slot, said cartridge including a tape provided with a hook at is outer end, said cartridge having a central post rigid with a lateral flange at one end, a spool comprising a lateral flange adapted to pivot about said central post and an outer peripheral wall provided with annular side flanges between which said tape is wound on said outer peripheral wall of said spool, a tape return spring being mounted in an annular chamber defined by said central post and said outer peripheral wall, said cartridge including an element for retaining the free end of said tape on said spool, said cartridge constituting a compact unit, said retaining element being formed integrally with said lateral flange rigid with said central post, said retaining element rigid with said central post having a notch formed therein and retaining lugs formed on the outer end of the return spring, the outer peripheral wall of said spool having a pair of apertures formed therein through which said return spring and said tape are interconnected.

16. The measuring instrument of claim 15, wherein the inner end of said return spring is anchored to said central post and the outer end of said spring is retained on the central post retaining element by two inner lugs formed on said retaining element, whereby the component elements of this sub-assembly can be assembled by automation means and subsequently incorporated in the complete instrument by mass-roduction means.

17. The measuring instrument of claim 15, wherein said measuring tape is coupled directly to said outer peripheral wall of said spool by meas of an aperture formed in the tape and adapted to engage a tongue formed in the aperture in said outer peripheral wall of said spool, a pair of bevels being formed on the lower edges of said last-mentioned aperture to prevent distortion of the measuring tape from decentering the tape winding.

18. The measuring instrument of claim 17, wherein the inner end of said return spring is anchored to said central post and the outer end of said spring is retained by the central post retaining element by two inner lugs formed in said retaining element, whereby the component elements of this sub-assembly can be assembled by automation means and subsequently incorporated in the complete instrument by mass-production means; wherein said outer peripheral wall of said spool has a pair of recesses formed therein and communicating with said aperture therein and dimensioned and configured cooperatively with said lugs whereby, when the tape is pulled to rotate the spool, said pair of lugs formed on the outer end of said spring are released from said inner lugs formed on said retaining element and, as a consequence of the traction force thus exerted on the tape, engage in said pair of recesses formed in said outer peripheral wall of said spool about said aperture.

19. The measuring instrument of claim 18, wherein a slot formed in said spool opening into the aperture formed in said outer peripheral wall of said spool is reinforced by projections formed on either side of the edges of said slot and adapted to prevent the distortion of said spool.

20. The measuring instrument of claim 17, wherein said pair of recesses cooperating with said aperture are adapted to receive said pair of lugs of said return spring, irrespective of the angular position of the outer end of said spring, a pair of notches being formed in the lateral edges of said spool for guiding said spool during the automatic assembly operation.

* * * * *